United States Patent [19]

McCormick et al.

[11] Patent Number: 4,998,606

[45] Date of Patent: Mar. 12, 1991

[54] PROGRAMMABLE BREAKAWAY CLUTCH SYSTEM WITH COLLAPSIBLE FAILURE MODE

[75] Inventors: Peter E. McCormick, Dallas; Walter D. Autry, Jr., Keene, both of Tex.

[73] Assignee: EOA Systems, Inc., Dallas, Tex.

[21] Appl. No.: 474,486

[22] Filed: Jan. 31, 1990

[51] Int. Cl.⁵ .............................................. F16D 43/20
[52] U.S. Cl. ................................. 192/56 F; 192/56 R; 464/36; 901/46; 901/49
[58] Field of Search ..................... 192/56 R, 56 F, 150; 901/29, 46, 49; 464/36, 38, 39

[56] References Cited

U.S. PATENT DOCUMENTS

| | | |
|---|---|---|
| 3,488,980 | 1/1970 | Burrough . |
| 3,626,506 | 12/1971 | Spieth . |
| 3,638,973 | 2/1972 | Poletti . |
| 3,819,286 | 6/1974 | Bianchi . |
| 4,103,849 | 8/1978 | Holt et al. . |
| 4,176,981 | 12/1979 | Clapper et al. . |
| 4,188,142 | 2/1980 | Olsson . |
| 4,245,729 | 4/1980 | Lunke et al. . |
| 4,328,621 | 5/1980 | Benjamin . |
| 4,514,616 | 4/1985 | Warner .......................... 901/49 X |
| 4,540,331 | 9/1985 | Stanner et al. .................... 901/49 X |
| 4,557,623 | 12/1985 | Tella . |
| 4,639,184 | 1/1987 | Knasel et al. ..................... 901/49 X |
| 4,661,038 | 4/1987 | Kohler et al. ..................... 901/49 X |
| 4,700,932 | 10/1987 | Katsuno ............................ 901/49 X |
| 4,717,003 | 1/1988 | McCormick et al. ............. 192/56 F |
| 4,725,190 | 2/1988 | Kato ................................... 901/49 X |
| 4,848,546 | 7/1989 | McCormick et al. ............ 192/56 F |
| 4,884,670 | 12/1989 | McCormick et al. ............ 192/56 F |

FOREIGN PATENT DOCUMENTS

| | | |
|---|---|---|
| 3025952 | 2/1982 | Fed. Rep. of Germany . |
| 216892 | 2/1985 | German Democratic Rep. . |
| 85/00315 | 1/1985 | PCT Int'l Appl. . |

OTHER PUBLICATIONS

Robotic Accessories' brochure entitled "Uni-Coupler Safety Joint".
Rumble Equipment advertisement, p. 9, Robotics World, Jan., 1986.
Kuka brochure, pp. 26–27 disclosing collision protective device.
Diagram labeled "G. M. Clutch".
Diagram labeled "Oilfield Tool by Whipstock, Inc.".

Primary Examiner—Richard Lorence
Attorney, Agent, or Firm—Daniel V. Thompson

[57] ABSTRACT

A breakaway clutch for robot end-of-arm tooling includes a housing and movable member constrained within the housing for movement along a central axis. A tool connecting member is linked to the movable member by way of a capsule-shaped link. The tool connecting member is located such that a movable member is in the normal position and the tool connecting member is movable in all directions except in the direction of a front housing wall. The movable member is biased toward the normal position, with the biasing being adjustable to vary the bias and thereby vary the sensitivity of the clutch to forces applied to the movable member by way of the tool connecting member. Movement of the movable member away from the normal position is sensed to send an alarm signal to the robot controller.

4 Claims, 2 Drawing Sheets

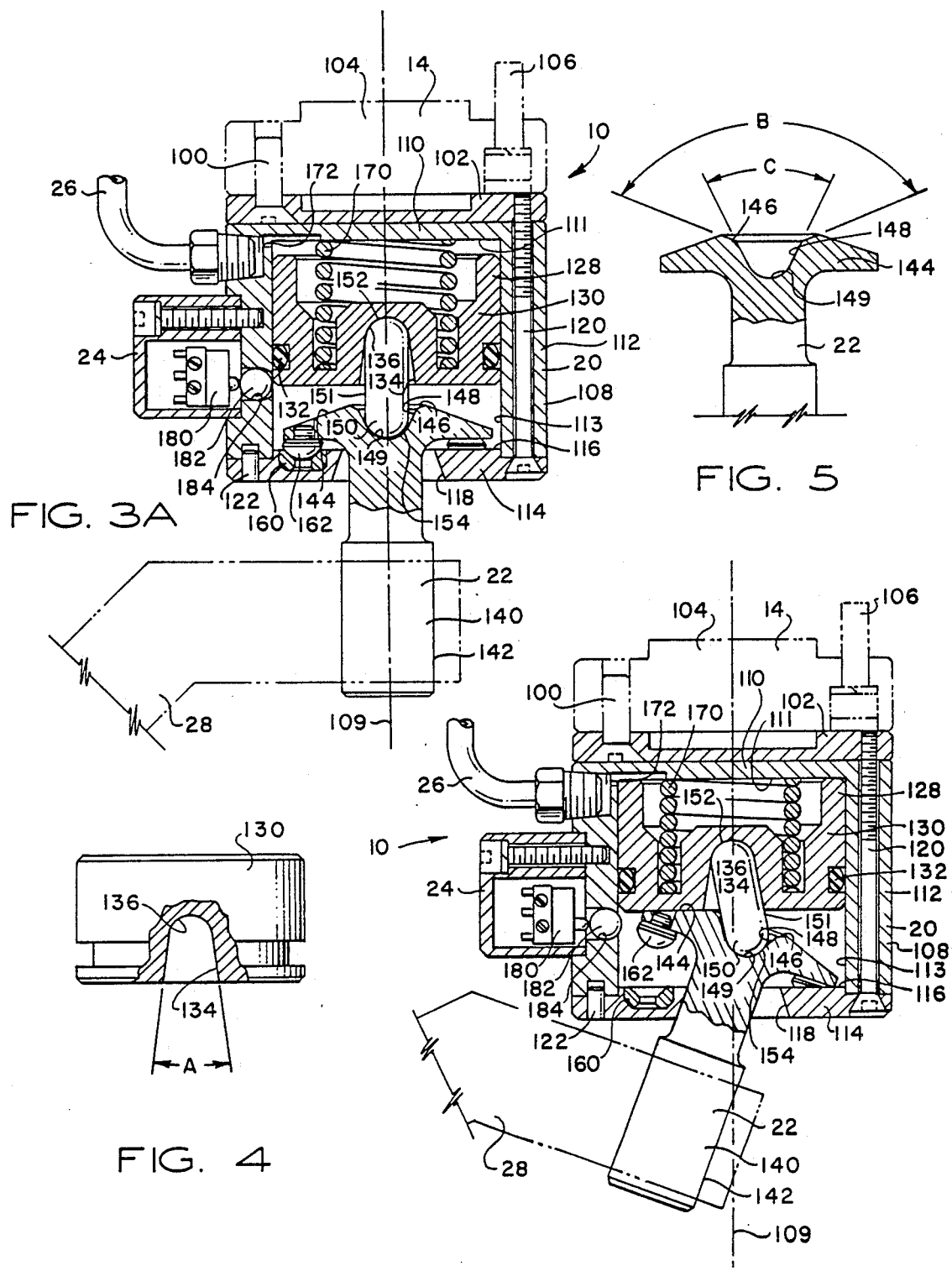

PROGRAMMABLE BREAKAWAY CLUTCH SYSTEM WITH COLLAPSIBLE FAILURE MODE

TECHNICAL FIELD

This invention relates to robotic tooling, and more particularly to an overload sensitive clutch for connecting a tool to the end of a robot arm.

BACKGROUND OF THE INVENTION

A problem in the use of robots in tooling operations is the problem of overload on the robot arm. This may occur if the robot arm or tool collides with something or if the tool gets stuck in the workpiece.

Several devices have been proposed and are in use that detect stresses and overloads on the robot arm and immediately shut down the robot when overload is detected in order to avoid damage to the robot or to the workpiece. These devices include expandable breakaway joints and connectors that break away when the robot arm experiences an overload.

For example, the devices shown in our U.S. Pat. Nos. 4,717,003 and 4,848,546 are expandable clutches useful in most robotic tooling situations. It has been found, however, that a collapsible clutch is preferable for use when the tool is an arc welding electrode, as collisions with the work piece are a more common occurrence. An expandable clutch as shown in our previous patents may not trip at a low enough threshold to protect the welding torch from damage if a collision puts the clutch into a compression failure mode. It has also been found that the ball and socket type of connection utilized in our expandable clutches is inappropriate for use in a collapsible clutch due to excessive friction between the parts, causing nonrepeatability.

SUMMARY OF THE INVENTION

The invention includes an adjustable clutch for use with robot end-of-arm tooling that provides a means for sensing movement of a tool attached to the clutch. The clutch includes a sealed piston movable member held within a chamber. The movable member is attached by a link to a tool connecting toggle. The piston is capable of lateral movement within the chamber, and the sensitivity of the breakaway clutch is adjusted by biasing the movement of the piston. In the preferred embodiment, the piston is biased using spring means and by introducing pressurized air into the piston chamber. A sensing device detects movement of the toggle relative to the clutch to shut down the robot when an overload is encountered.

The present invention provides a breakaway clutch having a collapsible failure mode. The clutch is ideal for use with arc welding tooling. The clutch has a sensor capable of detecting movement of the tool in relation to the clutch and of tripping an emergency stop when the movement is beyond a predetermined range of movement allowed. The clutch restores itself to a normal position when the overload is relieved.

According to one embodiment of the invention, the clutch includes a clutch housing that defines a piston cavity, a piston contained within the cavity, and a toggle that is attached to the piston through the housing by a link. The clutch includes biasing means to bias the piston in a direction toward the toggle. The toggle has locating means for positioning the piston in a normal operational position in relation to the housing and proximity sensing means for sensing deviations of the toggle from its normal position. In a preferred embodiment, the link is a capsule-shaped solid body engaged with frustroconical/spherical internal walls in the piston and toggle.

BRIEF DESCRIPTION OF THE DRAWINGS

The foregoing and additional objects and advantages of the invention will be more apparent when the following detailed description is read in conjunction with the accompanying drawings, wherein like reference characters denote like parts in all views and wherein:

FIG. 3A is a partial sectional view taken along lines 3—3 of FIG. 2 showing the normal position of the clutch;

FIG. 3B is a partial sectional view taken along lines 3—3 of FIG. 2 showing the overload position of the clutch;

FIG. 4 is a partially broken away side view of a piston; and

FIG. 5 is a partially broken away side view of a toggle.

DETAILED DESCRIPTION OF THE PREFERRED EMBODIMENT

The invention provides an "on the fly" adjustable clutch for use with robot end-of-arm tooling. The clutch is positioned between the robot arm and the tool and provides a means for sensing motion of the tool relative to the clutch that would indicate an overload on the system. The clutch is adjustable under program control so as to vary the load capacity and resistance of the clutch to handle various types and sizes of tools with varying sensitivity and is therefore ideal for use in interchangeable tooling systems. The clutch may be used in combination with a robot having an emergency stop, or other stop means, so that when an overload is sensed by the clutch it trips the emergency stop thereby preventing damage to the robot, the tool or to the workpiece.

Figure 1:
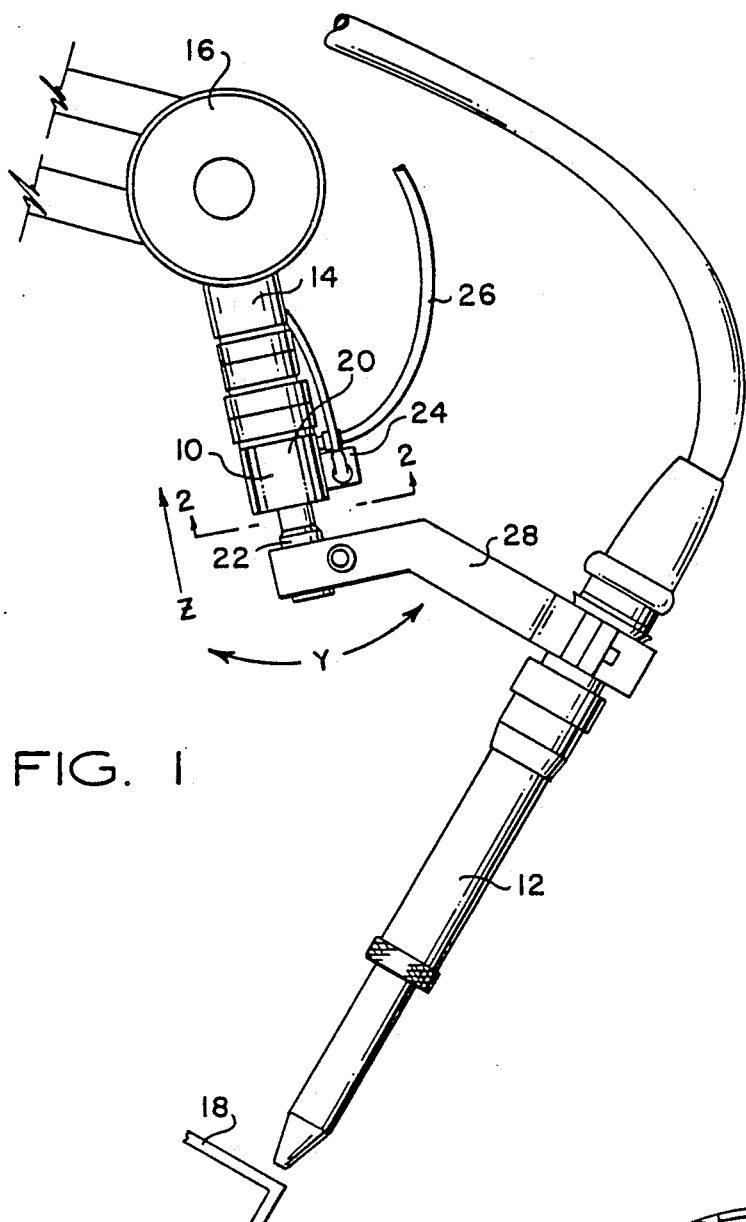
FIG. 1 is a side view of a robot arm utilizing the clutch of the present invention.
Figure 2:
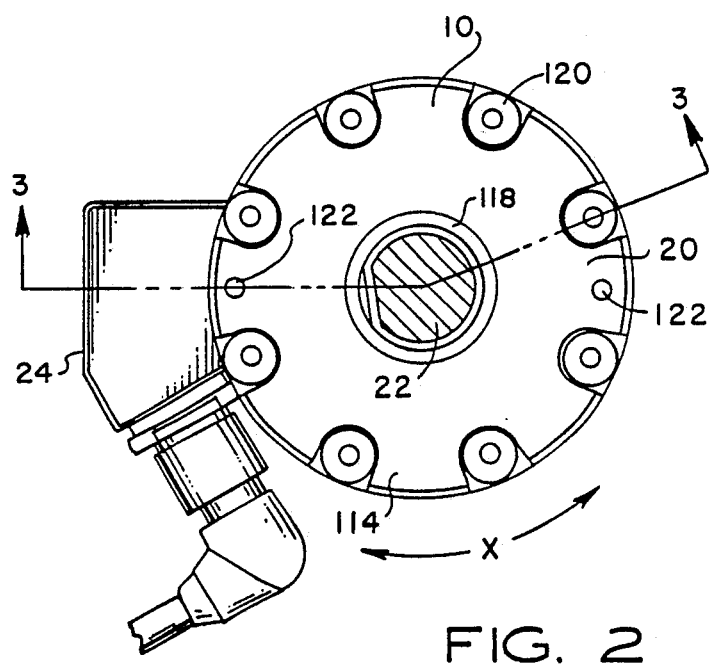
FIG. 2 is a sectional view of the clutch of FIG. 1 taken along lines 2—2.

Referring initially to FIGS. 1 and 2, a clutch 10 according to the present invention attaches an arc welding torch 12 to end 14 of robot arm 16. Torch 12 is shown in position to weld workpiece 18. The exterior portions of clutch 10 include a housing 20, a toggle 22, electrical connector 24, and a compressed air line 26. Torch 12 is attached to toggle 22 by way of arm 28. It is important to sense forces and moments on torch 12 in the X, Y and Z directions, so that abnormal forces and moments may be utilized to shut down robot arm 16. Forces in the Z direction are sensed in order to enable a compression failure mode.

Referring now to FIGS. 3A and 3B in addition to FIGS. 1 and 2, clutch 10 is attached to end 14 of the robot arm by way of bolts 100 extending through rear mounting plate 102 into an insulating robot adapter plate 104. Plate 104 is attached to the robot arm by way of bolts 106.

Housing body 108 is a generally tubular member having circular cross-sections about central axis 109. A rear housing wall 110 includes a rear cavity wall 111. Side housing wall 112 has an inner side cavity wall 113. A front housing cover 114 provides a forward cavity wall 116. Front housing cover 114 has a centrally located opening defined by wall 118. Front housing cover 114 and housing body 108 are fixed to rear mounting plate 102 by way of bolts 120 and locating pins 122.

A movable member includes piston 130 and O-ring 132 confined within the cavity formed by walls 111, 113 and 116. Wall 113 is cylindrical about central axis 109. Movable member 128 is capable of linear movement along central axis 109 from a normal position within the cavity shown in FIG. 3A wherein piston 130 is spaced apart from rear cavity wall 111. Movable member 128 is movable in the direction of rear cavity wall 111 to a position where piston 130 contacts wall 111, as shown in FIG. 3B. Movable member 128 includes an inwardly tapering frustroconical internal side wall 134 joined to a semi-spherical internal end wall 136. Internal side and end walls 134 and 136 are coaxial with central axis 109 and open in the direction of front cavity wall 116. A tool connecting member 140 includes toggle 22 and arm 28. Tool connecting member 140 has an external end 142 adapted for connecting clutch 10 to a tool. Tool connecting member 140 has an internal end 144 within the cavity, and internal end 144 has inwardly-tapering frustroconical internal first and second side walls 146 and 148, respectively, joined to a semi-spherical internal end wall 149. Internal side and end walls 146, 148 and 149 are coaxial with central axis 109, and open in the direction of the rear cavity wall 111.

Link 150 spans between tool connecting member 140 and movable member 128. Link 150 is a capsule-shaped solid body having a cylindrical side wall 151. Link 150 has semi-spherical external end walls 152 and 154 engaging with internal end walls 136 and 149, respectively, in the movable member and tool connecting member. Movable member 128 and tool connecting member 140 are spaced apart by link 150, and forces upon tool connecting member 140 are applied to movable member 128 by way of link 150.

Tool connecting member 140 is located within the cavity by way of conical seats 160 and spherical pins 162. Preferably, five seats 160 and pins 162 are provided in a asymmetrical pattern to provide a single return orientation for tool connecting member 140. Seats 160 are fixed in front housing cover 114. Tool connecting member 140, link 150 and movable member 128 are dimensioned such that movable member 128 is in the normal position shown in FIG. 3A when tool connecting member 140 is located such that pins 162 are seated in seats 160. Tool connecting member 140 is movable in all directions except in the direction of front cavity wall 116.

A spring 170 biases movable member 128 towards the normal position established by the linkage to tool connecting member 140 and the locating pins and seats. Movable member 128 is also biased towards the normal position by way of variable air pressures applied through air line 26 to the cavity by way of passageway 172. Thus, the sensitivity of clutch 10 to forces and moments applied to the movable member 128 by way of the tool connecting member 140 is variable.

Movement of the movable member 128 away from the normal position shown in FIG. 3A is sensed by way of a microswitch 180 fixed within electrical connector 24. Microswitch 180 is actuated by a bearing ball 182 constrained for linear movement within a cylindrical wall 184 formed in housing body 108.

Referring now to FIGS. 4 and 5, internal side wall 134 in piston 130 preferably has a taper A of about 13°. First internal side wall 146 of toggle 22 preferably has a taper B of about 137°, and second internal side wall 148 preferably has a taper C of about 52°.

In operation, any compression force on tool connecting member 140 having a component in the Z direction or a moment having a component in the X or Y direction will apply force by way of link 150 to movable member 128. If the force and/or moments exceed a threshold predetermined by the bias on movable member 128 by way of spring 170 and air pressure in line 26, movable member 128 will shift away from the normal position shown in FIG. 3A to a position exemplified by FIG. 3B. In FIG. 3B, movable member 128 has moved in the direction of rear cavity wall 111 to an extent that bearing ball 184 has been allowed to move inwardly. In the normal position, bearing ball 184 is forced outwardly by piston 130, thereby causing microswitch 180 to indicate normal operation. When bearing ball 184 shifts inwardly due to movement of movable member 128, microswitch 180 sends an alarm signal to the robot controller.

An important feature of the invention is the capsule-shaped link 150, which allows a virtually friction-free linkage between toggle 22 and piston 130. The spherical end walls of link 150 allow unlimited relative rotation between the two members, while compression forces are transmitted by the linkage. The linkage exerts a virtual perpendicular friction-free load between toggle 22 and piston 130.

Having described only a single embodiment of the invention, it will be apparent to those skilled in the art that there may be many changes and modifications to this invention without departing from the spirit and scope of the invention.

What is claimed is:

1. A breakaway clutch for robot end-of-arm tooling, comprising:
    a housing having a cavity, said cavity being defined by a forward cavity wall, a rear cavity wall and a side cavity wall, with said side cavity wall being cylindrical about a central axis;
    a movable member confined within the cavity, said movable member capable of linear movement along said central axis from a normal position within said cavity spaced apart from said rear cavity wall to a position spaced more closely to said rear cavity wall, said movable member including an inwardly-tapering frustroconical internal side wall joined to a semi-spherical internal end wall, and said internal side and end walls being coaxial with said central axis and open in the direction of said front cavity wall;
    a tool connecting member having an external end adapted for connecting the clutch to a tool, said tool connecting member having an internal end within said cavity, said internal end having an inwardly-tapering frustroconical internal side wall joined to a semi-spherical internal end wall, and said internal side and end walls being coaxial with said central axis when said movable member is in said normal position and open in the direction of said rear cavity wall;
    a link spanning between said tool connecting member and said movable member, said link having semi-spherical external end walls engaged with said internal end walls of said movable and tool connecting members, such that said movable member and tool connecting member are spaced apart and forces upon said tool connecting member are applied to said movable member;

means for locating said tool connecting member such that when said movable member is in said normal position said tool connecting member is located with respect to said front cavity wall and movable in all directions except in the direction of said front cavity wall;

biasing means for biasing said movable member toward said normal position established by said means for locating, said biasing means being adjustable to vary the bias and thereby vary the sensitivity of said clutch to forces applied to said movable member by way of said tool connecting member; and sensing means for sensing movement of said movable member away from said normal position.

2. The clutch of claim 1 where said link is a solid body having a cylindrical side wall between said semi-spherical end walls of said link.

3. The clutch of claim 1 wherein said frustroconical internal side wall in said movable member has a taper of about 13 degrees.

4. The clutch of claim 1 wherein said frustroconical internal side wall in said tool connecting member has a taper of about 52 degrees.

* * * * *